(12) United States Patent
Ions (10) Patent No.: US 7,691,178 B2
(45) Date of Patent: Apr. 6, 2010

(54) PRODUCTION OF IRON (75) Inventor: Philip James Ions, Shelley (AU)

(73) Assignee: Technological Resources Pty. Limited, Melbourne (AU)

( * ) Notice: Subject to any disclaimer, the term of this patent is extended or adjusted under 35 U.S.C. 154(b) by 534 days.

(21) Appl. No.: 11/405,586

(22) Filed: Apr. 18, 2006

(65) Prior Publication Data

US 2006/0272452 A1 Dec. 7, 2006

(30) Foreign Application Priority Data

Apr. 18, 2005 (AU) .............................. 2005901950

(51) Int. Cl.
*C21C 1/02* (2006.01)
*C21B 13/00* (2006.01)

(52) U.S. Cl. ...................... 75/500; 75/957; 266/142; 266/236

(58) Field of Classification Search ............... 75/500, 75/957; 266/142, 231, 236; 423/153, 154
See application file for complete search history.

(56) References Cited

U.S. PATENT DOCUMENTS

2006/0272447 A1 * 12/2006 Peaslee et al. ............. 75/10.62
2007/0261321 A1 * 11/2007 Ions ........................... 52/122.1
2007/0272058 A1 * 11/2007 Orth et al. .................. 75/502

FOREIGN PATENT DOCUMENTS

| CA | 2467310 A1 | * | 11/2004 |
| WO | WO 02/48408 A1 | * | 6/2002 |
| WO | WO 2005/040433 A2 | * | 5/2005 |
| WO | WO 2006/110949 A1 | * | 10/2006 |

OTHER PUBLICATIONS

Green light for Rio Tinto's Hismelt Pig Iron Plant, Australian Journal of Mining, Apr. 26, 2002.*
R.J. Dry, et al. Direct smelting: Why have so few made it?, Australian Academy of Technological Sciences and Engineering, (2002), p. 1-11.*
J. Young, Injection systems for refining pig iron and steel outside the furnace, Metallurgist, vol. 41, No. 1-2, (1997), p. 11-13.*
I. S. Lysyi et al, Desulfurization of pig iron and ensuring slag removal from hot-metal-car ladles, Metallurg., No. 4, (1984), p. 121-125.*

* cited by examiner

*Primary Examiner*—George Wyszomierski
*Assistant Examiner*—Mark L Shevin
(74) *Attorney, Agent, or Firm*—Oblon, Spivak, McClelland, Maier & Neustadt, L.L.P.

(57) ABSTRACT

A process for producing desulphurised iron in a solid form. The process includes (a) direct smelting an iron-containing metalliferous feed material and producing molten iron; (b) desulphurising molten iron produced in the direct smelting (a); and (c) casting desulphurised molten iron from the desulphurisation (b) into a solid form, such as pigs.

20 Claims, 10 Drawing Sheets

PRODUCTION OF IRON

FIELD OF THE INVENTION

The present invention relates to a process for producing iron.

The present invention relates more particularly to a process for producing iron that includes a molten bath-based direct smelting process that produces molten iron from iron-containing metalliferous feed material and subsequent processing of the molten iron that desulphurises the iron.

The present invention relates to a plant for producing iron.

DISCUSSION OF THE BACKGROUND

The term "iron-containing metalliferous feed material" is understood herein to include as iron ores, partly reduced iron ores, and iron-containing waste streams (for example, from steelmaking plants).

A known molten bath-based direct smelting process is generally referred to as the HIsmelt process. In the context of producing molten iron, the HIsmelt process includes the steps of:

(a) forming a bath of molten iron and slag in a direct smelting vessel;

(b) injecting into the bath: (i) a metalliferous feed material, typically iron ore in the form of fines; and (ii) a solid carbonaceous material, typically coal, which acts as a reductant of the iron ores and a source of energy; and (c) smelting metalliferous feed material to iron in the bath.

The term "smelting" is herein understood to mean thermal processing wherein chemical reactions that reduce metal oxides take place to produce molten metal.

In the HIsmelt process metalliferous feed material and solid carbonaceous material are injected into the molten bath through a number of lances/tuyeres which are inclined to the vertical so as to extend downwardly and inwardly through the side wall of the smelting vessel and into a lower region of the vessel so as to deliver at least part of the solids material into the metal layer in the bottom of the vessel. To promote the post-combustion of reaction gases in an upper part of the vessel, a blast of hot oxygen-containing gas, typically air or oxygen-enriched air, which may be oxygen-enriched, is injected into an upper region of the vessel through a downwardly extending lance. Off-gases resulting from the post-combustion of reaction gases in the vessel are taken away from the upper part of the vessel through an off-gas duct. The vessel includes refractory-lined water cooled panels in the side wall and the roof of the vessel, and water is circulated continuously through the panels in a continuous circuit.

Typically, molten iron produced in direct smelting processes such as the HIsmelt process contains concentrations of sulphur that are considerably higher than sulphur concentrations specified for steel. Therefore, desulphurisation of iron produced in direct smelting processes is necessary in order for the iron to be used in the production of steel.

SUMMARY OF THE INVENTION

In general terms, the present invention provides a process for producing iron in a solid form that includes the steps of:

(a) direct smelting an iron-containing metalliferous feed material and producing molten iron;

(b) desulphurising molten iron produced in direct smelting step (a); and (c) casting desulphurised molten iron from desulphurisation step (b) into a solid form, such as pigs.

Preferably the process includes continuously discharging molten iron from direct smelting step (a), desulphurising batches of molten iron from step (a) in desulphurisation step (b), and continuously supplying desulphurised molten iron to a casting apparatus and casting molten iron into a solid form, such as pigs, in casting step (c).

Preferably the process includes continuously discharging molten iron from direct smelting step (a) into a plurality of ladles or other suitable molten metal transfer means at a ladle filling station.

Preferably the process includes desulphurising molten iron from direct smelting step (a) on a batch basis in the ladles at a first desulphurisation station.

Preferably the process includes transferring the ladles containing desulphurised molten iron to a second desulphurisation station spaced away from the first desulphurisation station and de-slagging desulphurised molten iron at the second station.

Preferably the process includes discharging de-slagged and desulphurised molten iron from the ladles at the second desulphurisation station and forming a continuous stream of molten iron into the casting apparatus.

Preferably the process includes tilting the ladles in a first direction at the second desulphurisation station to de-slag molten iron from the ladles and tilting the ladles in a second direction that is opposite to the first direction at the second desulphurisation station to discharge molten iron from the ladles.

Preferably the process includes controlling the process so that there is at least one ladle in a docking area of the ladle filling station that is ready to receive molten iron in addition to a said ladle that is being filled with molten iron. This control requirement is important to cope with unexpected metal surge situations.

Preferably the process includes controlling the process so that there is at least one ladle in a docking area of the ladle filling station that is ready to receive molten iron in addition to a said ladle that is being filled with molten iron by the time that the ladle being filled is 50% full.

Preferably the process includes controlling the process so that there is always at least one ladle at the second desulphurisation station discharging de-slagged and desulphurised molten iron into the casting apparatus to ensure that there is the continuous stream of molten iron in the casting apparatus.

Preferably the process includes controlling the process so that at least immediately prior to completing discharge of de-slagged and desulfurised molten iron into the casting apparatus from a ladle at the second desulphurisation station there is at least another ladle in a docking area of the second desulphurisation station ready to discharge molten iron to the casting apparatus.

Preferably the process includes transferring ladles from a first docking area of the ladle filling station to a first docking area of the second desulphurisation station and transferring ladles from a second docking area of the ladle filling station to a second docking area of the second desulphurisation station.

Preferably the process includes the following sequence of process steps for each ladle, commencing with the ladle at the ladle filling station: continuously discharging molten iron from direct smelting step (a) into the ladle at the ladle filling station; when the ladle has been filled to a required extent, switching molten iron supply from the ladle to another ladle at the ladle filling station and continuously discharging molten iron into the other ladle at the station; desulphurising molten iron in the ladle at the first desulphurisation station, transferring the ladle from the first desulphurisation station to the second desulphurisation station after completing desulphurisation of molten iron in the ladle; de-slagging molten iron in the ladle at the second desulphurisation station; discharging de-slagged and desulphurised molten iron from the ladle into the casting apparatus, transferring the empty ladle from the second desulphurisation station to a holding station and heating the ladle at the station, and transferring the ladle from the ladle holding station to the ladle filling station.

In general terms, the present invention also provides a plant for producing iron in solid form that includes:

(a) a direct smelting apparatus that includes a direct smelting vessel for direct smelting an iron-containing metalliferous feed material and producing molten iron;

(b) a desulphurisation apparatus for desulphurising molten iron produced in the direct smelting apparatus; and (c) a casting apparatus for casting desulphurised molten iron into a solid form, such as pigs.

Preferably the direct smelting apparatus is adapted to discharge a continuous stream of molten iron.

Preferably the desulphurisation apparatus is adapted to desulphurise molten iron on a batch basis.

Preferably the casting apparatus is adapted to receive a continuous stream of molten iron for casting into the solid form.

Preferably the desulphurisation apparatus includes a first desulphurisation station for desulphurising molten iron and a second desulphurisation station for de-slagging desulphurised molten iron and thereafter for discharging desulphurised and de-slagged molten iron into the casting apparatus.

Preferably the plant includes a plurality of ladles or other suitable molten metal transfer means for receiving molten iron from the direct smelting vessel and transporting the molten iron from the desulphurisation apparatus to the casting apparatus and for discharging the desulphurised and de-slagged molten iron into the casting apparatus.

Preferably the direct smelting apparatus includes a ladle filling station at which, in use, molten iron can be supplied into ladles at the station.

Preferably the first desulphurisation station is located at the ladle filling station of the direct smelting apparatus and, in use, molten iron supplied from the direct smelting vessel to ladles at the ladle filling station is desulphurised at the station.

Preferably the second desulphurisation station is located away from the first desulphurisation station. The two spaced-apart stations are preferred for timing reasons and availability of ladles and transfer cars for the ladles due to space constraints.

Preferably the second desulphurisation station is located adjacent the casting apparatus.

Preferably the plant includes a ladle transfer assembly for carrying the ladles along a pathway between the ladle filling station of the direct smelting apparatus and the desulphurisation apparatus.

Preferably the ladle filling station includes two docking areas for ladles and the direct smelting vessel includes a runner assembly and a tilting launder that is adapted to switch supply of molten iron from one ladle located at one docking area to another ladle located at the other docking area.

Preferably the first desulphurisation station includes two docking areas for ladles and the second desulphurising station includes two docking areas for ladles.

Preferably the ladle transfer assembly includes (a) a first transfer car that is adapted to transfer ladles from a first docking area of the first desulphurisation station to a first docking area of the second desulphurisation station and (b) a second transfer can that is adapted to transfer ladles from a second docking area of the first desulphurisation station to a second docking area of the second desulphurisation station.

According to the present invention there is also provided a process for producing iron in solid form that includes producing molten iron in a direct smelting vessel and supplying the molten iron to ladles at a ladle filling station and thereby producing ladles of molten iron and discharging molten iron from the ladles into a casting apparatus located remotely from said filling station, which process is characterised by the steps of:

(a) locating a first ladle at a first docking area of the ladle filling station and providing a supply of molten iron from the direct smelting vessel to the first ladle and producing a ladle of molten iron, desulphurising molten iron in the first ladle, and discharging the desulphurised molten iron from the first ladle into the casting apparatus;

(b) locating a second ladle at a second docking area of the ladle filling station and switching the supply of molten iron from the first ladle to the second ladle upon completion of supplying molten iron to the first ladle and producing a ladle of molten iron, desulphursing the molten iron in the second ladle and discharging the desulphurised molten iron in the second ladle into the casting apparatus upon completion of discharging molten iron from the first ladle into the casting apparatus; and (c) continuing to locate ladles at the docking areas of the filling station and repeating the steps of supplying molten iron to the ladles, desulphurising the molten iron, and discharging the desulphurised molten iron into the casting apparatus so as to continuously supply molten iron to the filling station and to continuously discharge molten iron into the casting apparatus.

Preferably the step of continuing to locate ladles at the docking areas of the filling station includes transferring ladles back to the filling station after emptying the ladles into the casting apparatus.

Preferably the process includes transferring ladles back to the filling station via a ladle heating station after emptying the ladles into the casting apparatus.

Preferably the process includes holding at least one ladle at the ladle heating station until it is required by a docking area of the filling station.

Preferably the process includes transferring the first ladle from the first docking area of the filling station to a first docking area of the casting apparatus for discharging ladles into the casting apparatus and transferring the second ladle to a second docking area of the casting apparatus prior to completing discharge of molten iron from the first ladle into the casting apparatus.

Preferably the process includes locating a third ladle at the first docking area of the ladle filling station at a point in time between transferring the first ladle to the casting apparatus and completing supplying molten iron to the second ladle.

Preferably the process includes desulphurising molten iron in the ladles at the first and second docking areas of the filling station.

Preferably the process includes de-slagging the desulphurised molten iron at the casting apparatus.

Preferably the process includes transferring the ladles from the filling station to the casting apparatus at least in part by vehicle and transferring the ladles from the casting apparatus to the to said filling station at least in part by overhead crane.

Preferably the process includes desulphurising molten iron in the ladles at a desulphurisation station intermediate the filling station and the casting apparatus.

Preferably the process includes de-slagging desulphurised molten iron at the desulphurisation station intermediate the filling station and the casting apparatus.

BRIEF DESCRIPTION OF THE DRAWINGS

The present invention is described further with reference to the accompanying drawings, of which.

DESCRIPTION OF THE PREFERRED EMBODIMENTS

Figure 1:
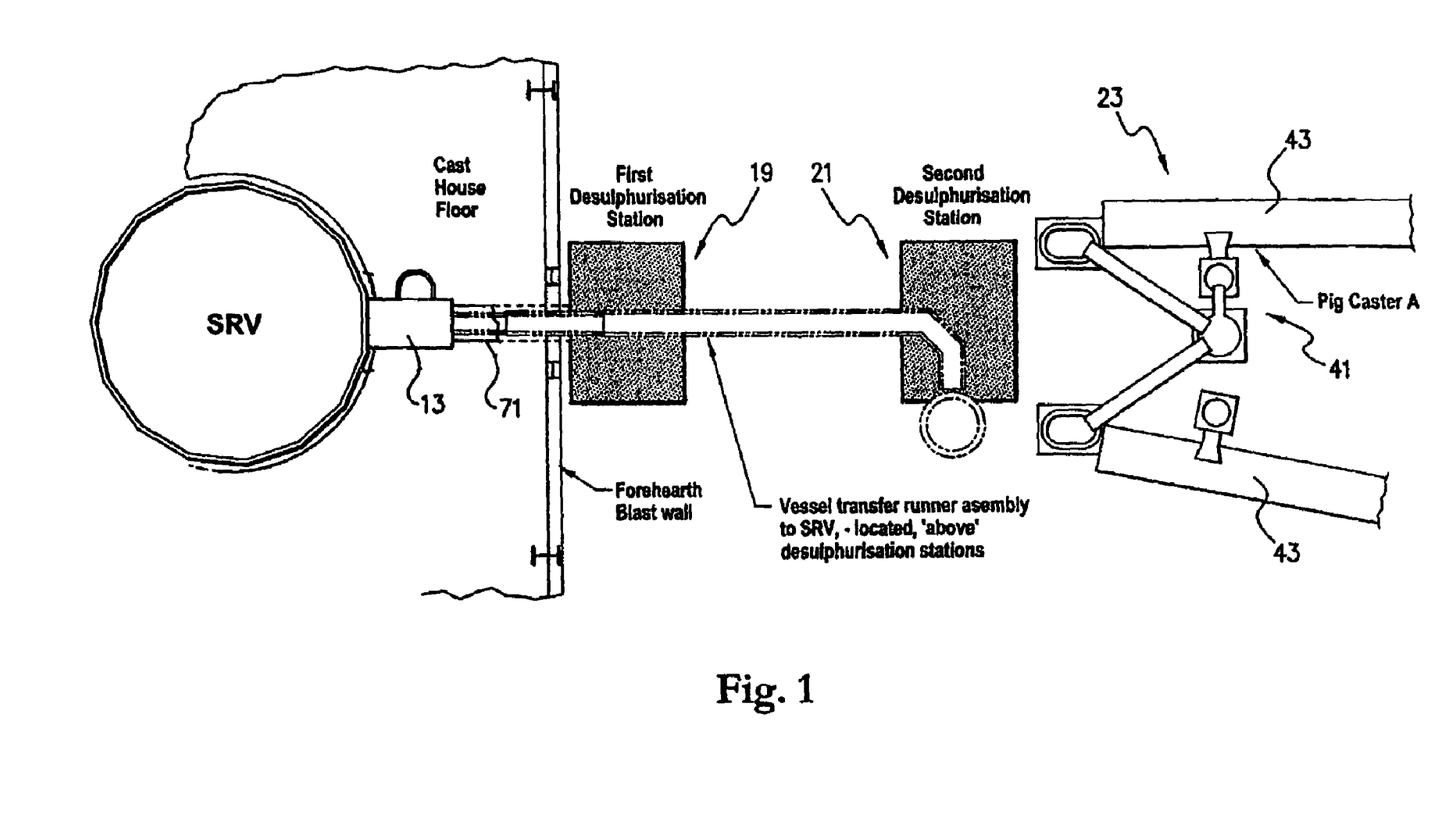
FIGS. 1 and 2 are top plan views that show the general layout of one embodiment of a plant for producing iron in accordance with the present invention that includes a direct smelting vessel of a direct smelting apparatus, a desulphurisation apparatus, and a casting apparatus.

The direct smelting plant shown in the Figures includes:

(a) a direct smelting apparatus that includes a direct smelting vessel (SRV) and a ladle filling station adjacent the vessel (SRV), (b) a casting apparatus 23 that includes two casters 43 for casting solid pigs of iron from molten iron from the vessel (SRV);

(c) a desulphurisation apparatus that includes a first desulphurisation station 19 (FIGS. 1, 3 and 4) adjacent the vessel (SRV) and a second desulphurisation station 21 (FIGS. 1 and 2) adjacent the casting apparatus 23, and (d) four ladles 7 for transferring molten iron discharged from the vessel (SRV) into the ladles 7 at the ladle filling station through the desulphurisation apparatus 21 to the casting apparatus 23.

The above-mentioned vessel (SRV), desulphurisation apparatus, casting apparatus 23, and ladles 7 are only parts of the direct smelting plant. It is not necessary to mention other parts of the plant in order to describe the invention properly.

The vessel (SRV) discharges molten iron continuously.

The pig casters 43 also operate substantially continuously and have a capacity (in tonnes per hour) substantially the same as the vessel (SRV). This means that the molten iron has to be supplied to the pig casters 43 at substantially the same rate at which it flows from the vessel (SRV).

The vessel (SRV) may be any suitable vessel for carrying out the HIsmelt process.

Australian patent application 27990/01 in the name of the applicant includes a description of the general construction of a HIsmelt vessel. The disclosure in the Australian patent application is incorporated herein by cross-reference.

In basic terms, the HIsmelt vessel described in Australian patent application 27990/01 has: a hearth that includes a base and sides formed from refractory bricks; side walls which form a generally cylindrical barrel extending upwardly from the sides of the hearth and include an upper barrel section and a lower barrel section; a roof; an outlet for offgases; outlets for discharging molten metal continuously and molten slag periodically. The vessel (SRV) is fitted with a downwardly extending gas injection lance (not shown) that delivers a hot air blast into an upper region of the vessel and eight solids injection lances extending downwardly and inwardly through a side wall and into the slag layer that inject iron ore, solid carbonaceous material, and fluxes entrained in an oxygen-deficient carrier gas into the metal layer.

Figure 3:
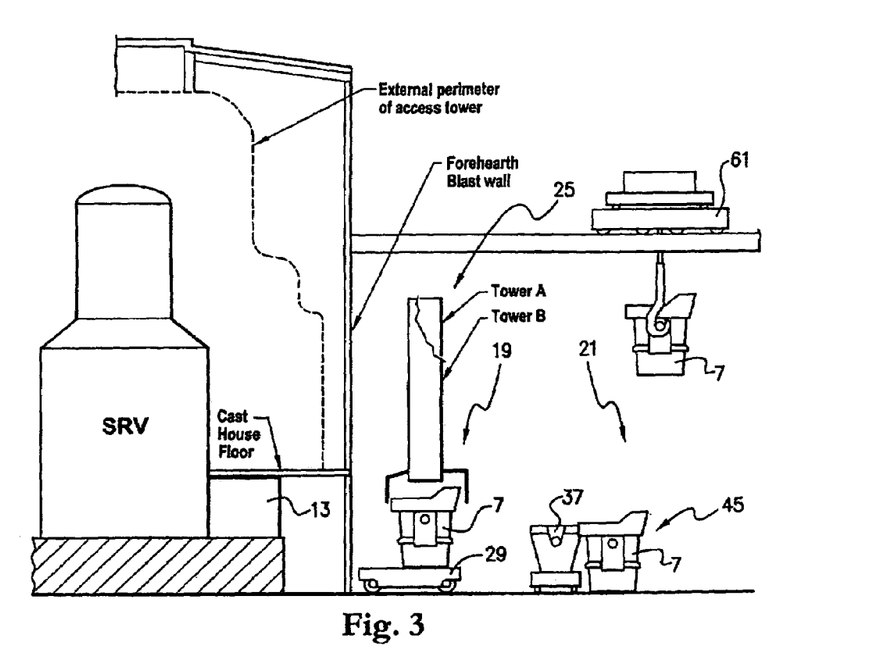
FIG. 3 is a side elevation that shows a ladle filling station of the direct smelting vessel and a first desulphurisation station of the desulphurisation apparatus.
Figure 4:
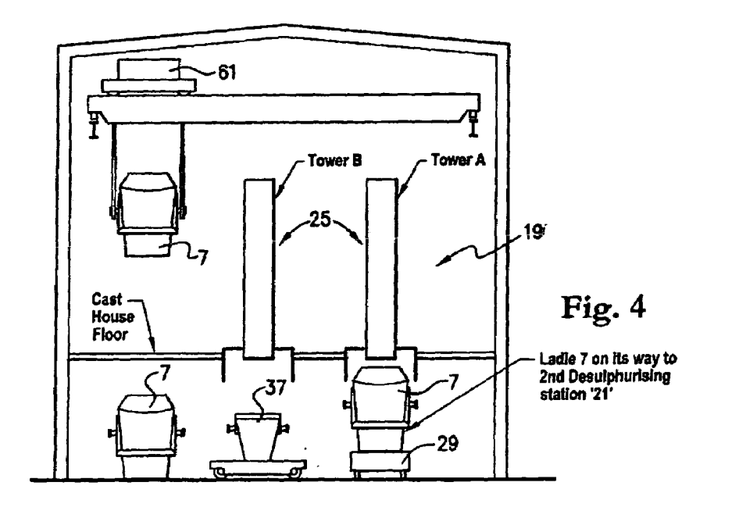
FIG. 4 is an end elevation of the part of the plant shown in FIG. 3.

In particular, the HIsmelt vessel includes a molten metal outlet in the form of a forehearth 13 (FIGS. 1 and 3) and a runner assembly 71 and a tilting launder 31 (FIGS. 5 to 11) for transferring molten iron continuously from the forehearth 13 to the ladle 7 at one of two docking areas of the ladle filling station adjacent the vessel (SRV). FIGS. 3 and 4 show one such ladle 7 at a docking area at the ladle filling station.

Figure 2:
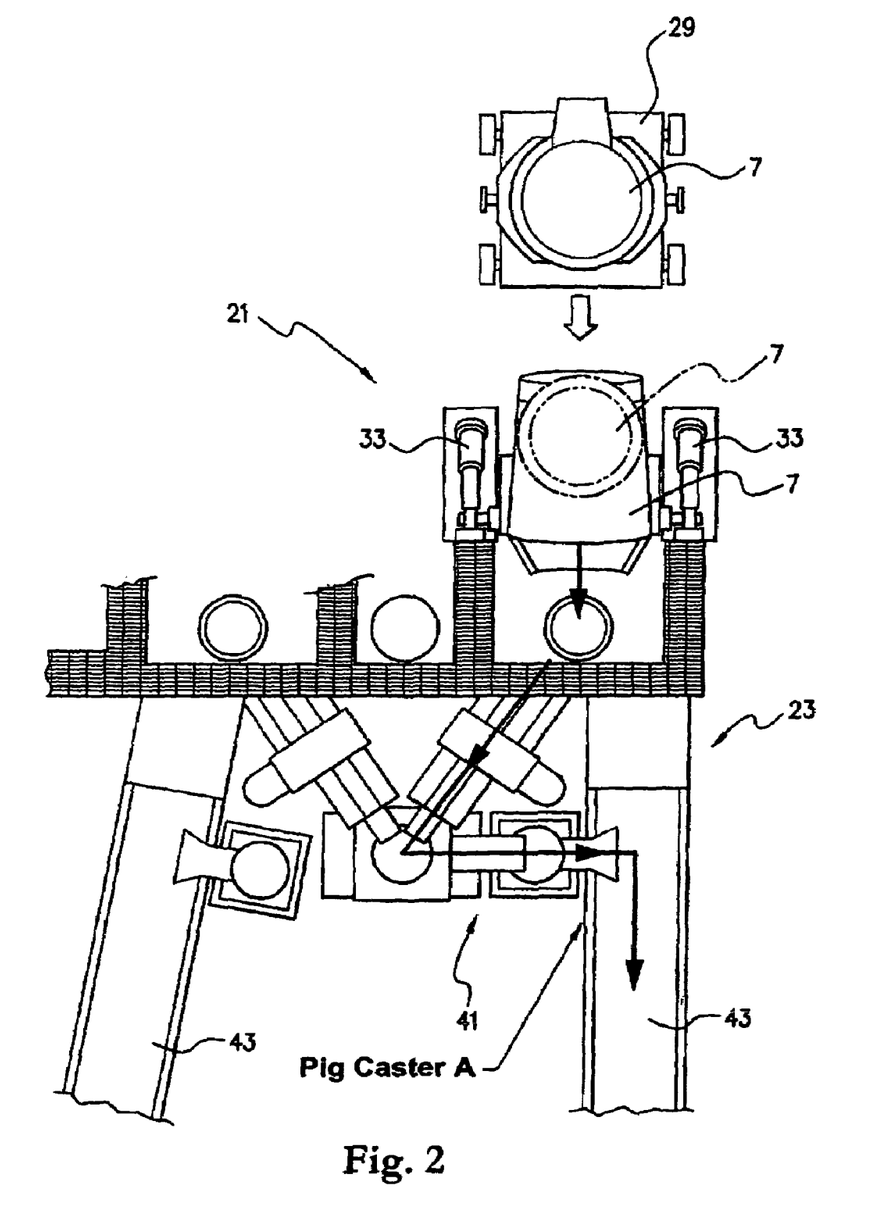

As indicated above, the desulphurising apparatus includes a first desulphurising station 19 for desulphurising molten iron from the vessel (SRV) in ladles 7 at the station and a second desulphurising station 21 for de-slagging molten iron in the ladles 7 at the station. FIGS. 3 and 4 show one such ladle 7 at the first desulphurisation station 19. FIG. 2 shows one such ladle 7 at the second desulphurisation station 21.

The first and second desulphurising stations 19, 21 are spaced apart, with the first desulphurising station 19 being positioned above the ladle filling station of the vessel (SRV) and the second desulphurising station 21 being located adjacent the casting apparatus 23. Alternate embodiments may space the ladle filling station from the first desulphurisation station 19, in this instance de-slagging of the desulphurised molten iron may occur at the first desulphurisation station.

The plant operates with four ladles 7. An explanation for the selection of four ladles 7 is provided in a later section of the specification.

The ladles 7 are moved between the ladle filling station and the second desulphurising station 21 on transfer cars 29.

The first desulphurisation station 19 includes two desulphurisation towers 25 (FIGS. 3 and 4). Each tower 25 is located above a docking area of the ladle filling station i.e. at the location where the ladles 7 can receive molten iron from the vessel (SRV). The tilting launder 31 (FIGS. 5 to 11) that receives molten iron from the runner assembly 71 directs molten iron to the appropriate ladle 7 and hence tower 25. When the ladle 7 is full, the tilting launder 31 directs molten iron to the ladle 7 at the other tower 25 and the full ladle 7 undergoes desulphurisation by injection of desulphurising agents into the molten iron.

After desulphurisation is completed, the transfer car 29 on which the ladle 7 is located transfers the ladle containing desulphurised molten iron to a tilting machine 33 at the second desulphurisation station 21. The tilting machine 33 takes the ladle off the transfer car 29 and the transfer car 29 moves away from the tilting machine 33 and back towards the tower 25 from which it came. The tilting machine 33 first tilts the ladle 7 toward the desulphurisation tower 25 and a slag rabbler 35 (FIG. 11), rakes slag off the surface of the desulphurised molten iron into a slag pot 37 the slag pot is mobile, and moves into and out of position as required (typically in a direction transverse to the direction of movement of the transfer car 29 and ladle 7). After de-slagging the ladle 7 is tilted toward and pours de-slagged and desulphurised molten iron into a runner assembly 41 that transfers the molten iron to the operational caster 43 of the casting apparatus. For this reason the second desulphurisation station 21 may also be referred to as a discharge station.

Once empty, the ladle 7 is picked up from the tilting machine 33 by a gantry crane 61 (FIGS. 3, 4 and 11) and is transferred to a heating station 45 (FIGS. 5 to 11), where it is effectively kept warm until it is needed.

After releasing the full ladle 7 to the tilting machine 33, the transfer car 29 moves into a position where it receives a heated ladle 7 from the heating station 45 via the gantry crane 61. The transfer car 29 and the new ladle 7 then move into position at the docking area under the desulphurisation tower 25 at that docking area.

The above-described cycle is summarised below with reference to FIGS. 5 to 10.

In the following description in relation to FIGS. 5 to 10, the ladles 7 are referred to as "Ladle 1", "Ladle 2", "Ladle 3", and "Ladle 4".

Figure 5:
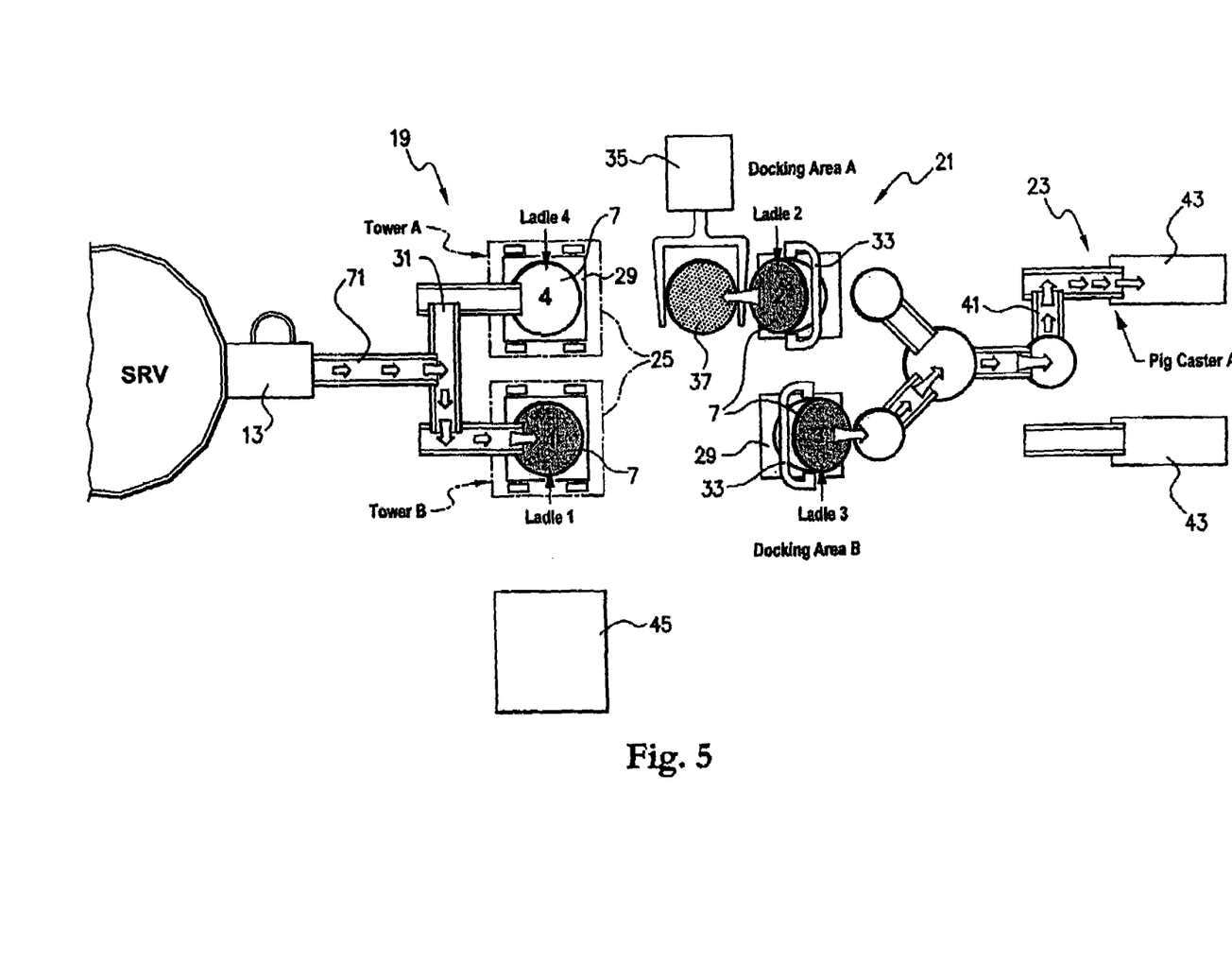
FIGS. 5 to 10 illustrate diagrammatically one embodiment of a process for producing iron in accordance with the present invention.

FIG. 5.
  Ladle 1—located under tower B of the first desulphurisation station 19 and being filled with molten iron from the vessel (SRV).
  Ladle 2—located at docking area A of the second desulphurisation station 21 and being de-slagged.
  Ladle 3—located at docking area B of the second desulphurisation station and pouring desulphurised and de-slagged molten iron into a runner assembly connected to pig caster A.
  Ladle 4—located under tower A of the first desulphurisation station and waiting to be filled with molten iron from the vessel (SRV).

Figure 6:
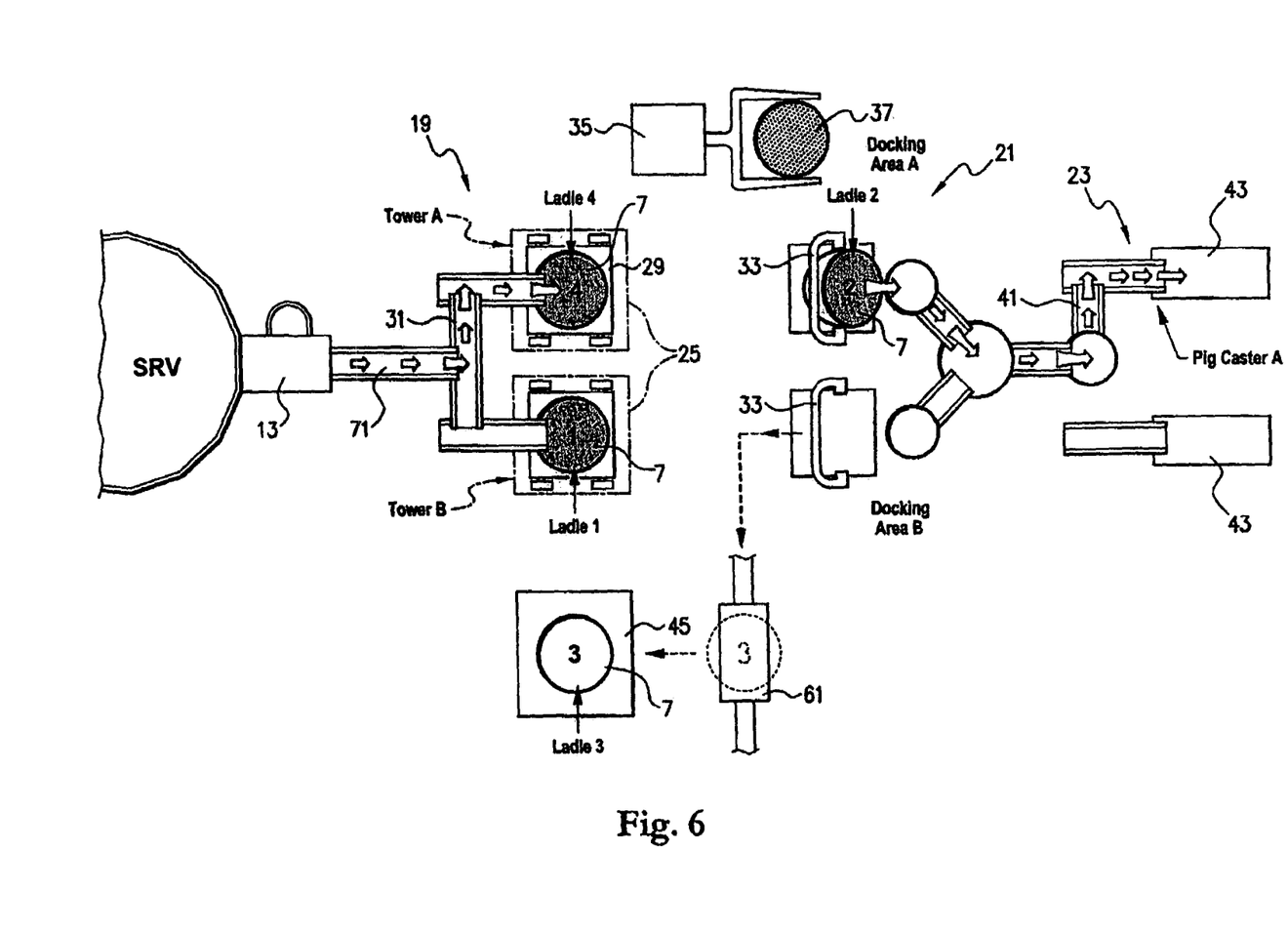

FIG. 6
  Ladle 1—located under tower B of the first desulphurisation station, filling completed, and molten iron being desulphurised.
  Ladle 2—located at docking area A of the second desulphurisation station, de-slagging completed, and pouring desulphurised and de-slagged molten iron into a runner assembly connected to pig caster A.
  Ladle 3—empty, and moved to holding area 45 by gantry crane 61 and being heated to maintain ladle temperature.
  Ladle 4—located under tower A of the first desulphurisation station and being filled with molten iron from the vessel (SRV).

Figure 7:
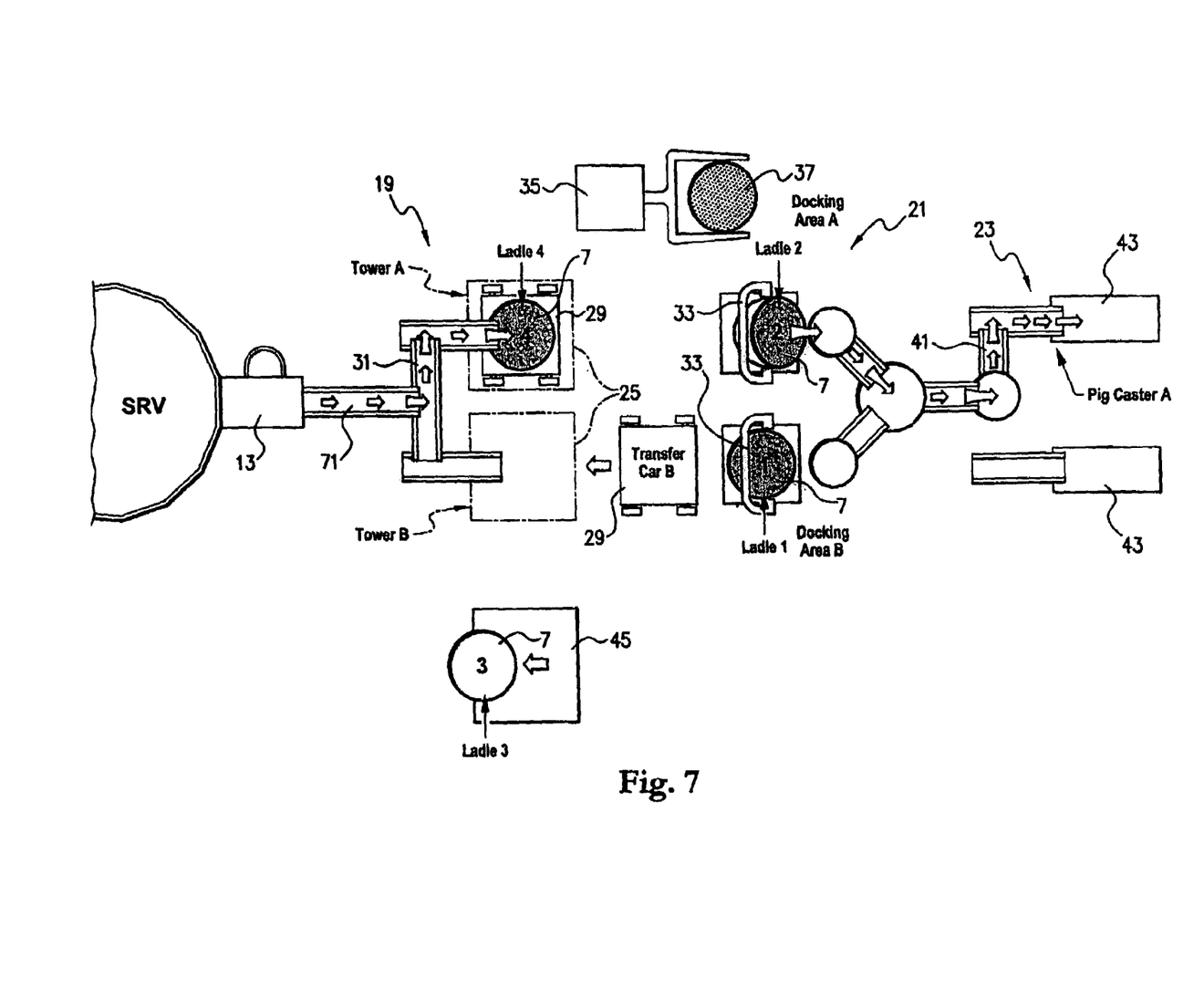

FIG. 7.
  Ladle 1—located at docking area B of the second desulphurisation station, after being desulphurised and transported to the docking area on transfer car B.
  Ladle 2—located at docking area A of the second desulphurisation station and continuing pouring desulphurised and de-slagged molten iron into the runner assembly connected to pig caster A.
  Ladle 3—empty, and in the process of being moved from the holding area to be positioned on transfer car B as the car is being moved back to tower B of the first desulphurisation station.
  Ladle 4—located under tower A of the first desulphurisation station and continuing to be filled with molten iron from the vessel (SRV).

Figure 8:
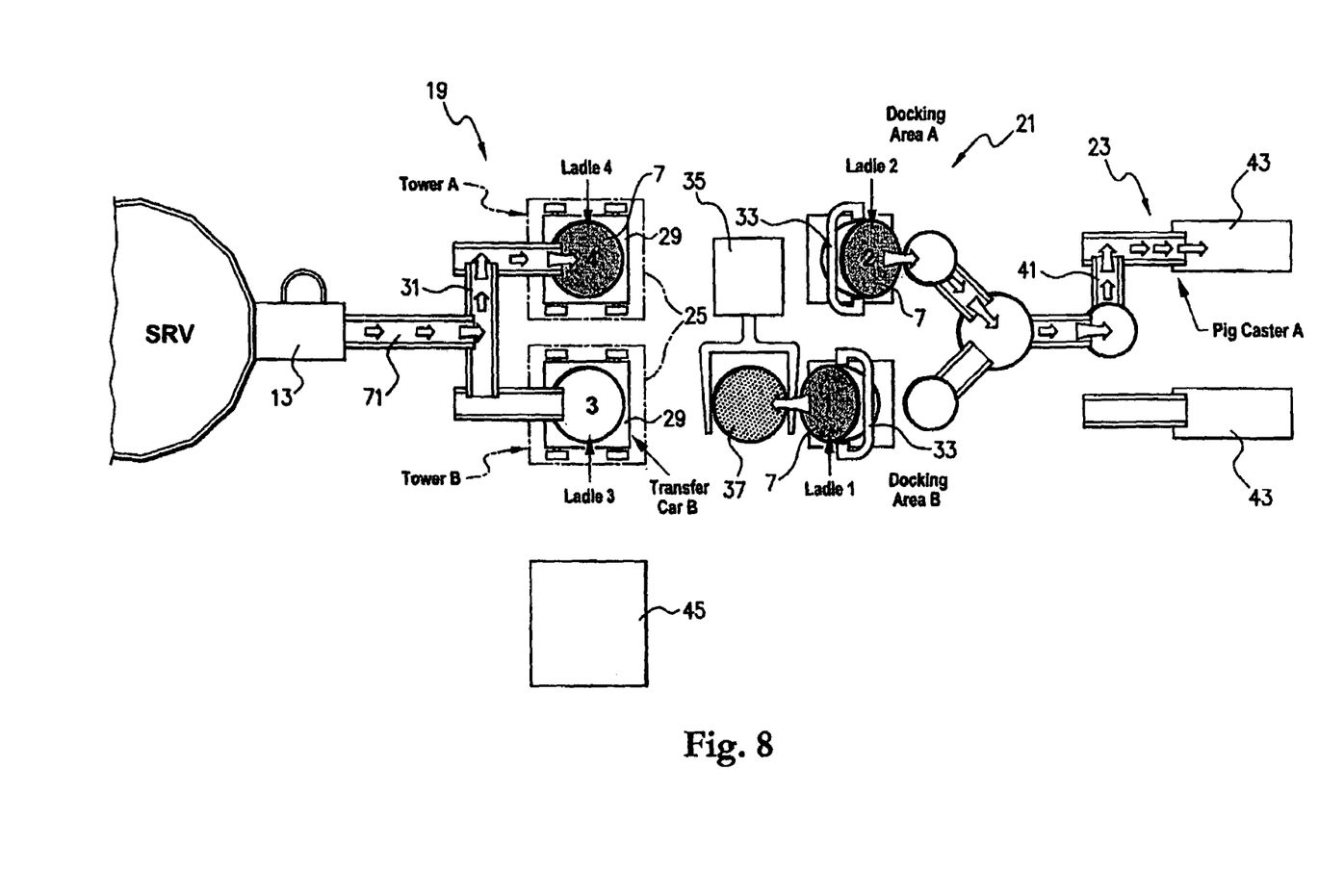

FIG. 8.
  Ladle 1—located at docking area B of the second desulphurisation station and being de-slagged. The slag pot 37 has moved into position to receive slag from ladle 7.
  Ladle 2—located at docking area A of the second desulphurisation station and continuing pouring desulphurised and de-slagged molten iron into the runner assembly connected to pig caster A.
  Ladle 3—empty, and located on transfer car B at tower B of the first desulphurisation station.
  Ladle 4—located under tower A of the first desulphurisation station and continuing to be filled with molten iron from the vessel (SRV).

Figure 9:
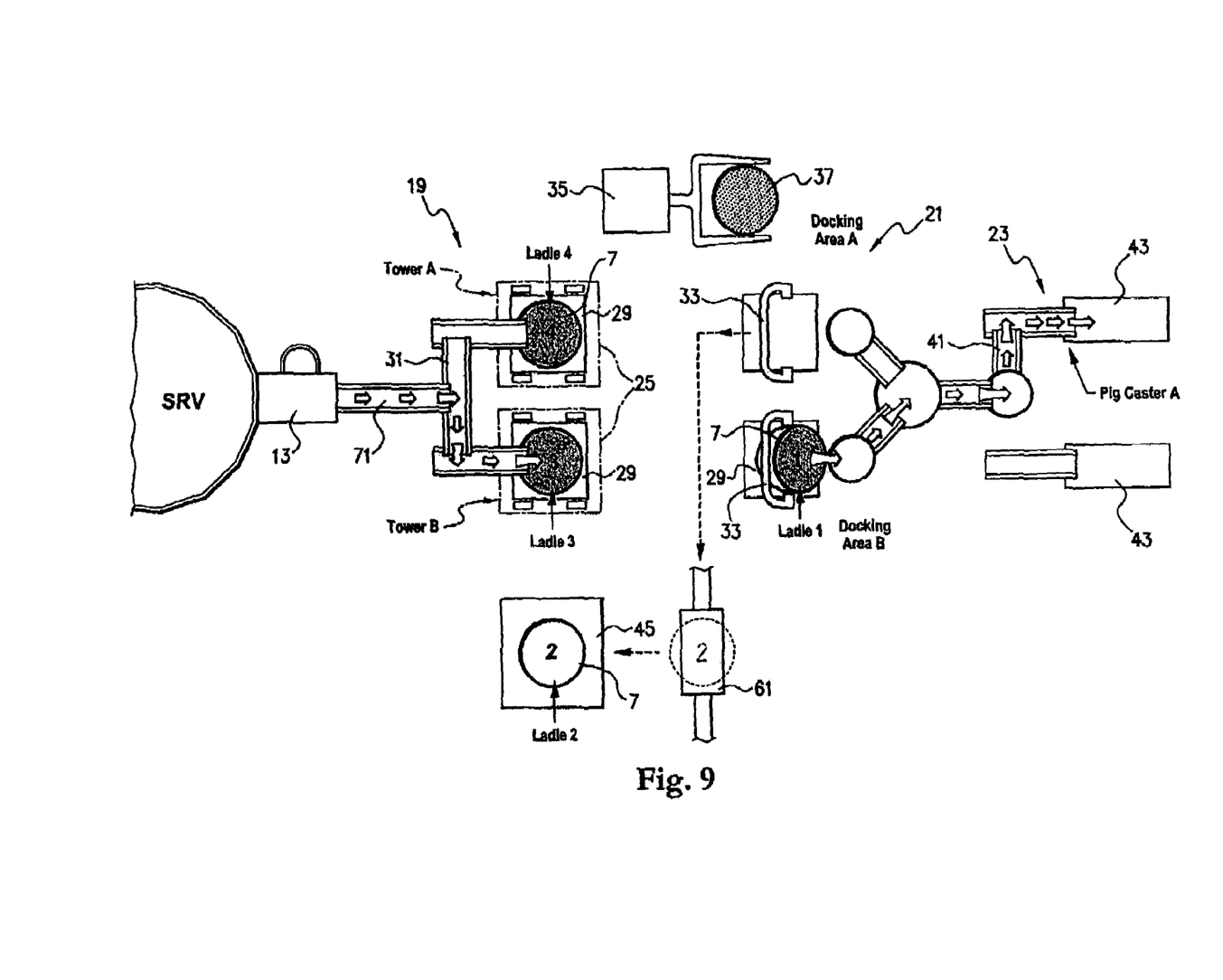

FIG. 9.
  Ladle 1—located at docking area B of the second desulphurisation station, de-slagging completed, and pouring desulphurised and de-slagged molten iron into a runner assembly connected to pig caster A.
  Ladle 2—empty, and moved to at holding area by gantry crane and being heated to maintain ladle temperature.
  Ladle 3—located under tower B of the first desulphurisation station and being filled with molten iron from the vessel (SRV).
  Ladle 4—located under tower A of the first desulphurisation station, filling completed, and molten iron being desulphurised.

Figure 10:
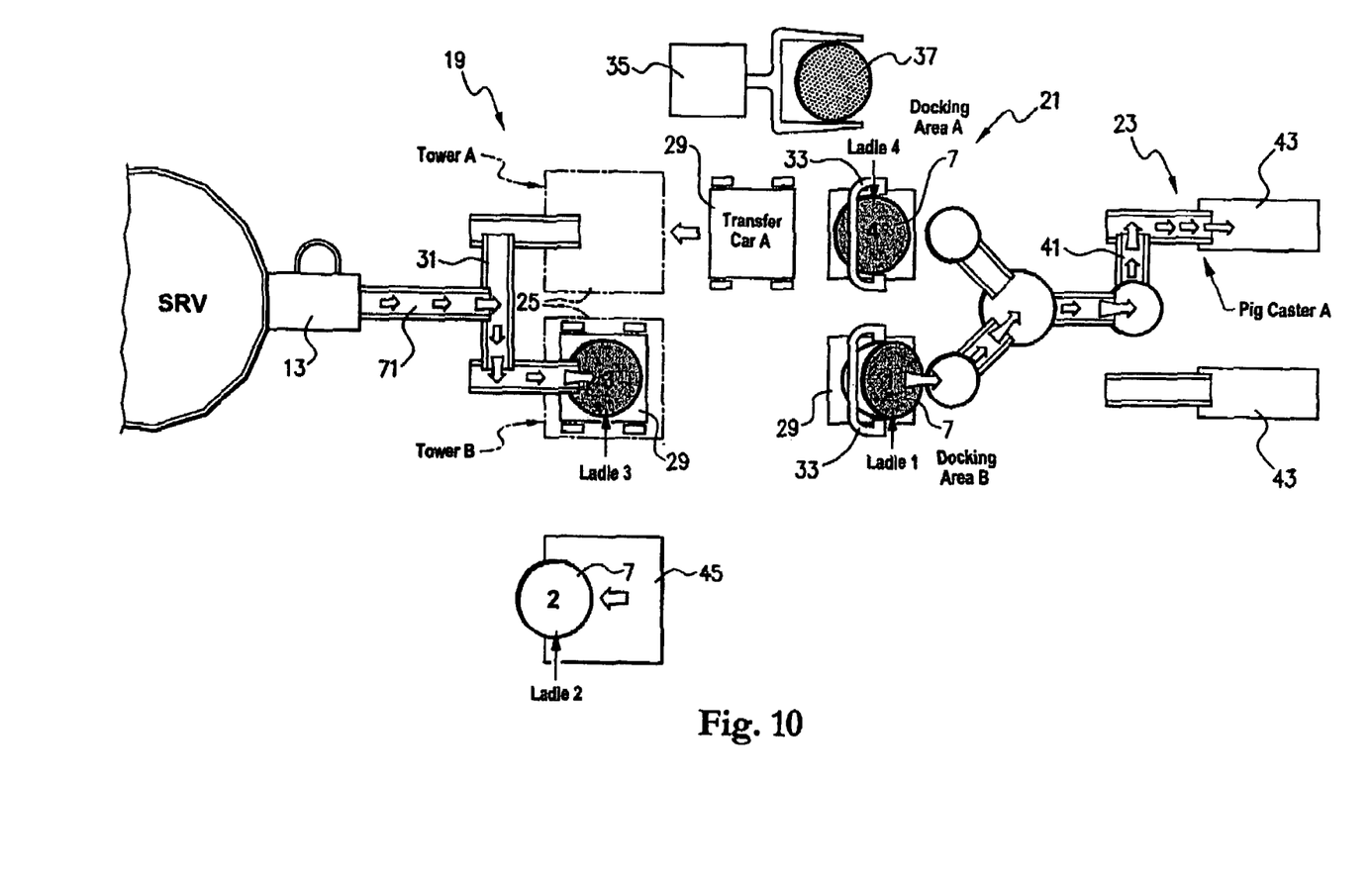

FIG. 10.
  Ladle 1—located at docking area B of the second desulphurisation station and continuing pouring desulphurised and de-slagged molten iron into the runner assembly connected to pig caster A.
  Ladle 2—empty, and in the process of being moved from the holding area to be positioned on transfer car A as the car is being moved back to tower A of the first desulphurisation station.
  Ladle 3—located under tower B of the first desulphurisation station and continuing to be filled with molten iron from the vessel (SRV).
  Ladle 4—located at docking area A of the second desulphurisation station, after being desulphurised and transported to the docking area on transfer car A.

Figure 11:
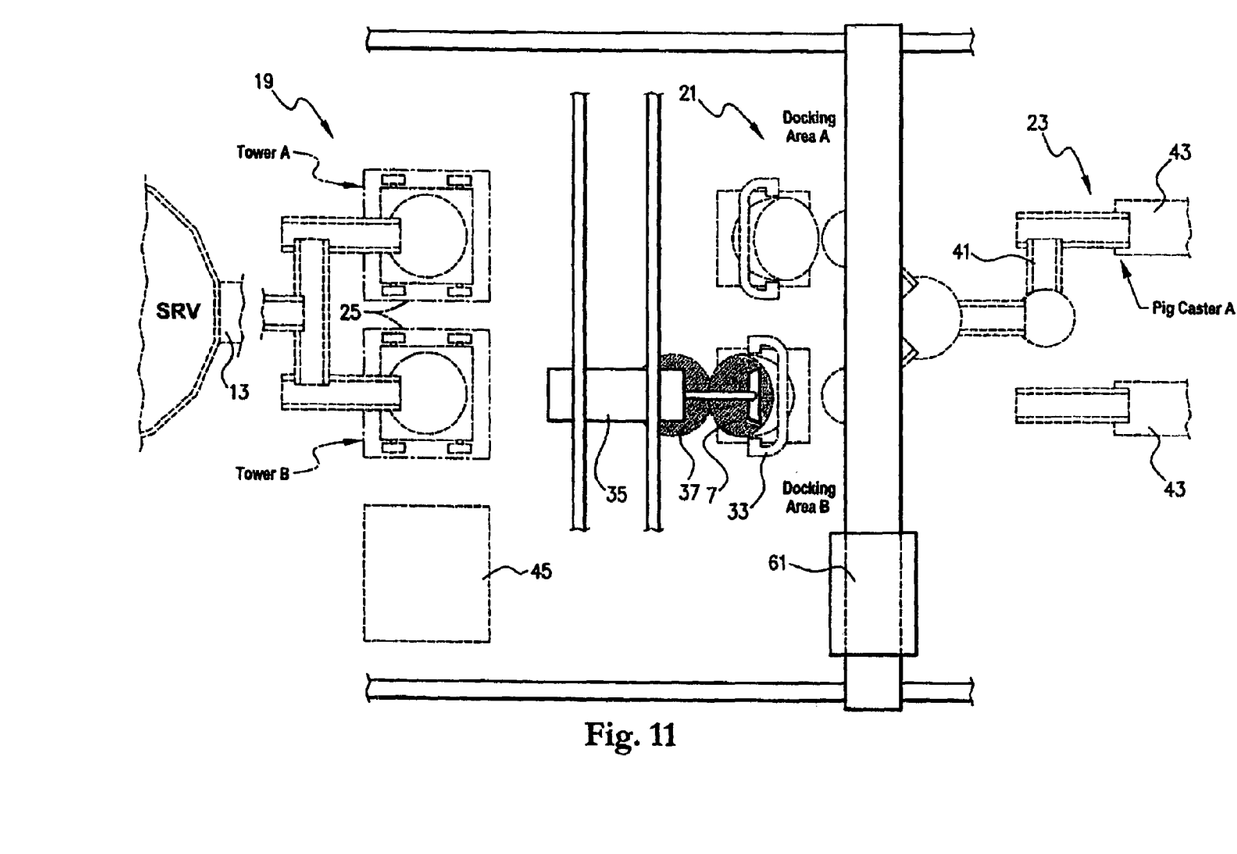
FIG. 11 is a diagram that shows the operation of a de-slagging machine of the desulphurisation apparatus.

FIG. 11 shows in very diagrammatic form the slag rabbler 35 and the separate gantry crane 61 that moves ladles between the second desulphurisation station, the ladle heating station and the transfer cars (which then move the ladles back toward the filling station and underneath the first desulphurisation station).

Typically, the slag rabbler 35 is located below the gantry crane 71 and operates independently of the gantry cane. The slag rabbler moves transversely to the gantry crane 71 and services both docking area A and B of the second desulphurisation station 21.

Typically, the ladles 7 have a capacity of 80 tonnes.

In a typical medium scale commercial plant the vessel (SRV) is rated to produce molten iron at a maximum flow rate of 108 t/h (except under surge conditions when the flow rate may be significantly greater than 108 t/h).

The selection of four ladles 7 is based on ensuring safe operation of the plant when the vessel (SRV) is producing molten iron at the maximum flow rate of 108 t/h. Specifically, the selection is based on ensuring that there are always ladles 7 at critical locations, such as the ladle filling station and the ladle discharge station.

The desulphurisation apparatus can operate safely with only three 80 t ladles if the plant operates at approximately 105 t/h.

If there are only two ladles 7, there would be a break in molten iron flow to the pig casters 43 of the casting apparatus 23 during de-slagging and transfer of the ladies 7 between the first desulphurisation station 19 and the second desulphurisation station 21.

The vessel SRV can enter into a condition where the molten iron surges (such as during an over pressure condition) and it is anticipated that up to 10 t/min of molten iron can flow from the vessel. Under normal operating conditions about 1.8 t/min of molten iron flows from the vessel, so a surge condition can be a significant event leading to an over flow of metal into the desulphurisation area if not accounted for properly. It is expected that a surge condition could last for up to three minutes and is corrected by ceasing to supply hot air blast (HAB) to the vessel.

To account for the possibility of a surge condition, the maximum time that one of the desulphurisation towers 25 can be without an empty ladle 7 in the docking area adjacent the ladle that is being filled needs to be less than the minimum ladle filling time that occurs in the event of a surge. For a surge of 10 t/min that lasts for three minutes, this equates to 30 t of hot metal into the ladle. Accordingly, it is preferable that the second ladle be docked when the first ladle is 50% full.

Many modifications may be made to the embodiment of the present invention described above without departing from the spirit and scope of the invention.

By way of example, the requirement for a substantially continuous flow of molten metal to the pig casters 43 means that only one pig caster 43 can operate at any one time. The runner 77 (FIGS. 5 to 11) between the two pig casters 43 is not a tilting runner for safety reasons. There is effectively only one runner and it is switched from side to side as required so as to ensure isolation of the other pig caster from molten iron. Hence two pig casters 43 are not essential to the invention, though they are a practical necessity from a maintenance point of view.

The invention claimed is:

1. A process for producing iron in a solid form that comprises:
   (a) direct smelting an iron-containing metalliferous feed material in a direct smelting vessel and producing a continuous stream of molten iron;
   (b) filling ladles with molten iron from the continuous stream at first and second docking areas of a ladle filling station adjacent to the direct smelting vessel and desulphurizing the molten iron produced in the direct smelting vessel on a batch basis in a ladle at a first desulphurization station adjacent to the direct smelting vessel and located at the first and second docking areas of the ladle filling station, transferring the ladle containing desulphurized molten iron to first or second docking areas of a second desulphurisation station spaced away from the first desulphurisation station and adjacent to a casting apparatus, and de-slagging desulphurized molten iron at the second desulphurisation station;
   (c) casting desulphurized molten iron into a solid form in the casting apparatus by discharging de-slagged and desulphurized molten iron from the ladle at the second desulphurisation station and forming a continuous stream of molten iron into the casting apparatus; and
   (d) controlling the process so that there is always at least one ladle at the second desulphurisation station discharging de-slagged and desulphurised molten iron into the casting apparatus to ensure a continuous stream of molten iron in the casting apparatus and so there is always at least one ladle at the ladle filling station receiving molten iron from the continuous stream of molten iron.

2. The process defined in claim 1, further comprising continuously discharging molten iron from the direct smelting vessel into a plurality or ladles at the ladle filling station.

3. The process defined in claim 1, further comprising tilting the ladles in a first direction at the second desulphurisation station to de-slag molten iron from the ladles and tilting the ladles in a second direction that is opposite to the first direction at the second desulphurisation station to discharge molten iron from the ladles.

4. The process defined in claim 2, further comprising controlling the process so that there is at least one ladle in a docking area of the ladle filling station that is ready to receive molten iron in addition to a said ladle that is being filled with molten iron by the time that the ladle being filled is 50% full.

5. The process defined in claim 1, further comprising controlling the process so that at least immediately prior to completing discharge of de-slagged and desulphurised molten iron into the casting apparatus from a ladle at the second desulphurisation station there is at least another ladle in a docking area of the second desulphurisation station ready to discharge molten iron to the casting apparatus.

6. The process defined in claim 1, further comprising transferring ladles from a first docking area of the ladle filling station to a first docking area of the second desulphurisation station and transferring ladles from a second docking area of the ladle filling station to a second docking area of the second desulphurisation station.

7. The process defined in claim 1, further comprising for each ladle, commencing with the ladle at the ladle filling station:
   continuously discharging molten iron from the direct smelting vessel into the ladle at the ladle filling station;
   when the ladle has been filled to a required extent, switching molten iron supply from the ladle to another ladle at the ladle filling station and continuously discharging molten iron into the other ladle at the station;
   desulphurising molten iron in the ladle at the first desulphurisation station, transferring the ladle from the first desulphurisation station to the second desulphurisation station after completing desulphurisation of molten iron in the ladle;
   de-slagging molten iron in the ladle at the second desulphurisation station;
   discharging de-slagged and desulphurised molten iron from the ladle into the casting apparatus, transferring the empty ladle from the second desulphurisation station to a holding station and heating the ladle at the station, and transferring the ladle from the ladle holding station to the ladle filling station.

8. A plant for producing iron in solid form that comprises:
   (a) a direct smelting apparatus that includes a direct smelting vessel for direct smelting an iron-containing metalliferous feed material and producing a continuous stream of molten iron and includes a ladle filling station at which, in use, molten iron can be supplied into ladles at the station;
   (b) a desulphurisation apparatus adapted to desulphurise on a batch basis molten iron produced in the direct smelting apparatus; and
   (c) a casting apparatus adapted to receive a continuous stream of molten iron for casting desulphurised molten iron into a solid form; and wherein the desulphurisation apparatus includes a first desulphurisation station adjacent to the direct smelting apparatus for desulphurising molten iron in the ladles at the ladle filling station and a second desulphurisation station adjacent to the casting apparatus and located away from the ladle filling station for de-slagging desulphurised molten iron and thereafter for discharging desulphurised and de-slagged molten iron into the casting apparatus.

9. The plant defined in claim 8, further comprising a plurality or ladles for receiving molten iron from the direct smelting vessel and transporting the molten iron from the desulphurisation apparatus to the casting apparatus and for discharging the desulphurised and de-slagged molten iron into the casting apparatus.

10. The plant defined in claim 8, further comprising a ladle transfer assembly for carrying the ladles along a pathway between the ladle filling station of the direct smelting apparatus and the second desulphurisation station.

11. The plant defined in claim 8, wherein the ladle filling station includes two docking areas for ladles and the direct smelting vessel includes a runner assembly and a launder that is adapted to switch supply of molten iron from one ladle located at one docking area to another located at the other docking area.

12. The plant defined in claim 11, wherein the first desulphurisation station includes two docking areas for ladles and the second desuiphurising station includes two docking areas for ladles.

13. The plant defined in claim 12, wherein the ladle transfer assembly includes (a) a first transfer car that is adapted to transfer ladles from a first docking area of the first desulphurisation station to a first docking area of the second desulphurisation station and (b) a second transfer car that is adapted to transfer ladles from a second docking area of the first desulphurisation station to a second docking area of the second desulphurisation station.

14. A process for producing iron in solid form that includes producing molten iron in a direct smelting vessel and supplying the molten iron to ladles at a ladle filling station and thereby producing ladles of molten iron and discharging molten iron from the ladles into a casting apparatus located remotely from said ladle filling station; the process comprising:
(a) locating a first ladle at a first docking area of the ladle filling station and providing a supply of molten iron from the direct smelting vessel to the first ladle and producing a ladle of molten iron, desulphurising molten iron in the first ladle at the ladle filling station, and de-slagging the desulphurised molten iron at the casting apparatus, and discharging the desulphurised molten iron from the first ladle into the casting apparatus;
(b) locating a second ladle at a second docking area of the ladle filling station and switching the supply of molten iron from the first ladle to the second ladle upon completing supply of molten iron to the first ladle and producing a ladle of molten iron, desulphurising the molten iron in the second ladle at the ladle filling station, de-slagging the desulphurised molten iron at the casting apparatus, and discharging the desulphurised molten iron in the second ladle into the casting apparatus upon completion of discharging molten iron from the first ladle into the casting apparatus; and
(c) continuing to locate ladles at the docking areas of the ladle filling station and repeating the steps of supplying molten iron to the ladles, desulphurising the molten iron, and discharging the desulphurised molten iron into the casting apparatus so as to continuously supply molten iron to the ladle filling station and to continuously discharge molten iron into the casting apparatus.

15. The process defined in claim 14, wherein the continuing to locate ladles at the docking areas of the ladle filling station further includes transferring ladles back to the ladle filling station after emptying the ladles into the casting apparatus.

16. The process defined in claim 15, further comprising transferring ladles back to the ladle filling station via a ladle heating station after emptying the ladles into the casting apparatus.

17. The process defined in claim 16, further comprising holding at least one ladle at the ladle heating station until it is required by a docking area of the ladle filling station.

18. The process defined in any of claims 14 to 17, further comprising transferring the first ladle from the first docking area of the ladle filling station to a first docking area of the casting apparatus for discharging ladles into the casting apparatus and transferring the second ladle to a second docking area of the casting apparatus prior to completing discharge of molten iron from the first ladle into the casting apparatus.

19. The process defined in claim 18, further comprising locating a third ladle at the first docking area of the ladle filling station at a point in time between transferring the first ladle to the casting apparatus and completing supplying molten iron to the second ladle.

20. The process defined in claim 19, further comprising transferring the ladles from the ladle filling station to the casting apparatus, at least in part, by vehicle and transferring the ladles from the casting apparatus to the ladle filling station, at least in part, by overhead crane.

* * * * *